United States Patent
May et al.

(10) Patent No.: US 12,371,604 B1
(45) Date of Patent: Jul. 29, 2025

(54) DRILLING FLUID ADDITIVES FOR HIGH-DENSITY RESERVOIR DRILLING FLUIDS

(71) Applicant: Halliburton Energy Services, Inc., Houston, TX (US)

(72) Inventors: Preston Andrew May, Houston, TX (US); Hui Zhou, Houston, TX (US); Jay Deville, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/629,410

(22) Filed: Apr. 8, 2024

(51) Int. Cl.
*C09K 8/05* (2006.01)
*C09K 8/487* (2006.01)

(52) U.S. Cl.
CPC ............... *C09K 8/487* (2013.01); *C09K 8/05* (2013.01)

(58) Field of Classification Search
CPC .......... C09K 8/52; C09K 8/467; C09K 8/487; C09K 8/03; C09K 8/035; C09K 8/04; C09K 8/12; E21B 21/00; E21B 21/003; E21B 33/13; E21B 33/138
See application file for complete search history.

(56) References Cited

U.S. PATENT DOCUMENTS

| | | | | |
|---|---|---|---|---|
| 4,959,165 A * | 9/1990 | Grimsley | ................ | C09K 8/60 507/216 |
| 6,138,755 A * | 10/2000 | Swartwout | ............ | C09K 8/665 166/250.1 |
| 10,336,850 B2 | 7/2019 | Zha et al. | | |
| 10,858,566 B2 | 12/2020 | Favero et al. | | |
| 10,883,037 B2 | 1/2021 | Zhou et al. | | |
| 11,746,275 B2 | 9/2023 | Linscombe | | |
| 2015/0191640 A1 | 7/2015 | Lee et al. | | |
| 2016/0215196 A1* | 7/2016 | Wang | ........................ | E21B 7/00 |
| 2017/0198189 A1 | 7/2017 | Panamarathupalayam | | |
| 2020/0308477 A1* | 10/2020 | Patil | .......................... | C09K 8/88 |
| 2020/0369938 A1 | 11/2020 | Linscombe | | |
| 2021/0171819 A1* | 6/2021 | Shumway | .............. | C09K 8/035 |
| 2022/0169911 A1* | 6/2022 | Cadix | .................. | C09K 8/5086 |
| 2022/0340803 A1* | 10/2022 | Eyaa Allogo | .......... | C09K 8/035 |
| 2023/0357622 A1 | 11/2023 | Linscombe | | |

FOREIGN PATENT DOCUMENTS

WO WO-2007104054 A1 * 9/2007 ............... C09K 8/12

OTHER PUBLICATIONS

Filing Receipt, Specification and Drawings for U.S. Appl. No. 18/629,270, entitled "Fluid Loss Control Additives for Drilling Fluids," filed Apr. 8, 2024, 31 pages.
Filing Receipt, Specification and Drawings for U.S. Appl. No. 18/629,458, entitled "Divalent-Brine-Based High Density Drilling Fluids," filed Apr. 8, 2024, 29 pages.

* cited by examiner

*Primary Examiner* — Angela M DiTrani Leff
(74) *Attorney, Agent, or Firm* — Conley Rose, P.C.; Rodney B. Carroll

(57) ABSTRACT

Drilling fluids for drilling a wellbore. An example drilling fluid includes an aqueous base fluid, a first fluid loss control additive that comprises a cross-linked polymer comprising N-vinylpyrrolidone as a monomer, and a second fluid loss control additive that comprises a cloud point glycol.

20 Claims, 3 Drawing Sheets

DRILLING FLUID ADDITIVES FOR HIGH-DENSITY RESERVOIR DRILLING FLUIDS

TECHNICAL FIELD

The present disclosure relates generally to wellbore operations, and more particularly, to the use of a fluid loss control additive with a drilling fluid to improve compatibility of the formed filter cake with subsequently introduced zinc-containing brines.

BACKGROUND

Natural resources such as gas, oil, and water residing in a subterranean formation can be recovered by drilling a wellbore down to the subterranean formation while circulating a drilling fluid in the wellbore. The drilling fluid can possess various properties that can be beneficial to the drilling of the subterranean formation. For example, the drilling fluid can possess a rheology sufficient to carry the cuttings of the subterranean formation to the surface. Additionally, the drilling fluid can be used to deposit a filter cake on the walls of the formed wellbore. The drilling fluid contacts the wall of the wellbore and builds up layers of residue on the exterior of the wellbore wall to form the filter cake. The filter cake prevents at least a portion of the drilling fluid from being lost into the subterranean formation, thereby allowing the drilling fluid to continue to circulate in the wellbore.

The deposited filter cake should be maintained to prevent fluid loss. Subsequently introduced fluids can precipitate portions of the filter cake, which can affect its filtration capability. The use of the drilling fluid is an important part of wellbore construction. The present invention provides improved drilling fluids for the drilling of a subterranean formation.

BRIEF DESCRIPTION OF THE DRAWINGS

Illustrative examples of the present disclosure are described in detail below with reference to the attached drawing figures, which are incorporated by reference herein, and wherein.

Figure 1:
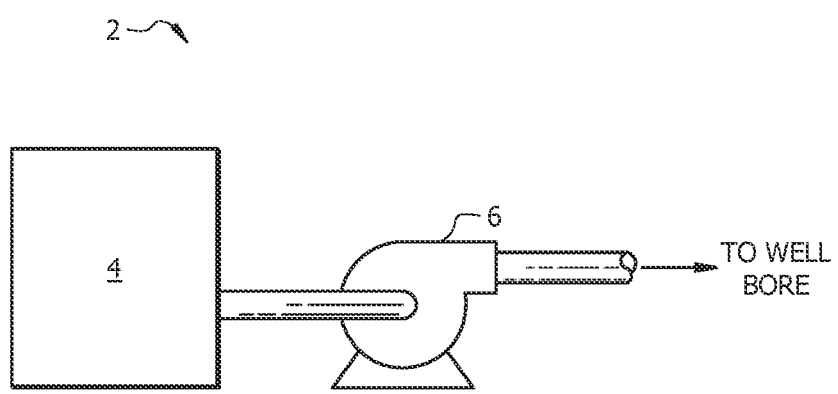
FIG. 1 illustrates a schematic of the preparation of a drilling fluid in accordance with one or more examples described herein.

The illustrated figures are only exemplary and are not intended to assert or imply any limitation with regard to the environment, architecture, design, or process in which different examples can be implemented.

DETAILED DESCRIPTION

The present disclosure relates generally to wellbore operations, and more particularly, to the use of a fluid loss control additive with a drilling fluid to improve compatibility of the formed filter cake with subsequently introduced zinc-containing brines.

In the following detailed description of several illustrative examples, reference is made to the accompanying drawings that form a part hereof, and in which is shown by way of illustration specific examples that can be practiced. These examples are described in sufficient detail to enable those skilled in the art to practice them, and it is to be understood that other examples can be utilized, and that logical structural, mechanical, electrical, and chemical changes can be made without departing from the spirit or scope of the disclosed examples. To avoid detail not necessary to enable those skilled in the art to practice the examples described herein, the description can omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that can vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed can be greater than some upper limits listed. One skilled in the art will recognize that the selected subset can include an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole can be used to refer to the location of various components relative to the bottom or end of a well. For example, a first component described as uphole from a second component can be further away from the end of the well than the second component. Similarly, a first component described as being downhole from a second component can be located closer to the end of the well than the second component.

The terms upstream and downstream can be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

The present disclosure relates generally to wellbore operations, and more particularly, to the use of a fluid loss control additive with a drilling fluid to improve compatibility of the filter cake with subsequently introduced zinc-containing brines. Advantageously, the drilling fluids are prepared with two fluid loss control additives. The first fluid loss control additive can be used to increase viscosity and provide fluid loss control to the drilling fluid. The second fluid loss control additive can be used to maintain fluid loss control during the introduction of subsequently introduced zinc-containing brines by improving the compatibility of the filter cake with the zinc-containing brines. The zinc-containing brines can be introduced into the wellbore after the introduction of the drilling fluid. These zinc-containing brines can be used as screen-running fluids and/or gravel packing fluids. As such, filtration control can be maintained even during the use of subsequently introduced zinc-containing brines. As a further advantage, the second fluid loss control additive introduces a manageable level of rheology and is compatible with many existing drilling fluid formulations.

The drilling fluids comprise a first fluid loss control additive. The first fluid loss control additive can be used in the drilling fluid to provide the dual functionalities of a viscosifier and a fluid loss control additive. The first fluid loss control additive can comprise a polymer. The first fluid loss control additive can comprise a cross-linked polymer having N-vinylpyrrolidone as a monomer. In some examples, the first fluid control additive is a homopolymer of cross-linked polyvinylpyrrolidone (PVP). The PVP can be branched or crosslinked. In embodiments, the first fluid loss control additive is a copolymer comprising an additional monomer(s) selected from the group including, but not limited to, acrylamide, N-substituted acrylamides (such as 2-acrylamido-2-methylpropanesulfonic acid (AMPS), N-ethylacrylamide, N-isopropylacrylamide, N,N-dimethylacrylamide, N-hydroxyethylacrylamide, diacetone acrylamide, methylol acrylamide, and dimethylaminopropyl acrylamide), methacrylamide, N-substituted methacrylamides (such as dimethylaminopropyl methacrylamide), acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-vinylamides (such as N-vinylformamide, N-vinylacetamide, and N-methyl-N-vinylacetamide), N-allylamides, vinyl alcohol, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates, allyl sulfonates, vinylimidazole, allylimidazole, allylamine, diallylamine, allyltrimethylammonium halide, diallyldimethylammonium chloride, and diallyldialkylammonium halide, additional monomers, or any combination thereof. If the first fluid loss control additive comprises the additional monomer(s), the additional monomer(s) can be present in the first fluid loss control additive polymer in a total concentration of about 10 mol % or less.

The concentration of the first fluid loss control additive in a drilling fluid can range from about 0.1% w/v to about 10% w/v wherein % w/v is equivalent to g/100 mL. The concentration can range from any lower limit to any upper limit and encompass any subset between the upper and lower limits. Some of the lower limits listed can be greater than some of the listed upper limits. One skilled in the art will recognize that the selected subset can include an upper limit in excess of the selected lower limit. Therefore, it is to be understood that every range of values is encompassed within the broader range of values. For example, the concentration of the first fluid loss control additive in the drilling fluid can range from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the first fluid loss control additive in the drilling fluid can range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), from about 0.1% (w/v) to about 1% (w/v), or from about 0.1% (w/v) to about 0.5% (w/v). With the benefit of this disclosure, one of ordinary skill in the art will be readily able to prepare and select a first fluid loss control additive having a desirable concentration for use in a given drilling fluid.

The drilling fluids comprise a second fluid loss control additive. The second fluid loss control additive can be used in the drilling fluid to maintain fluid loss control prior to and/or in the presence of subsequently introduced treatment fluids that comprise zinc. For example, a zinc-containing brine can be introduced to the wellbore as a screen running fluid or a gravel packing fluid. The second fluid loss control additive can maintain the filter cake in the presence of these subsequently introduced zinc-containing brines. The second fluid loss control additive comprises a cloud point glycol (CPG). A cloud point glycol is a glycol or glycol derivative that is soluble at low temperatures but starts to form micelles (e.g., molecular agglomerates), thus becoming cloudy, as the temperature is raised. The temperature at which this phenomenon occurs (or the "cloud point") can be affected by salinity, with the cloud point temperature generally being lower in more saline fluids.

When used in conjunction with inhibitive salts such as, calcium bromide or other divalent brines as described herein, a cloud point glycol can serve to minimize zinc contamination fluid loss. The second fluid loss control additive/cloud point glycol can be selected based on the expected downhole temperature and selected base fluid (e.g., salinity) to ensure adequate clouding properties for maximum (initial and/or subsequent zinc contamination) fluid loss control. Without being limited by theory, when the fluid environment is above the cloud point, the cloud point glycol can become insoluble in water (e.g., in the drilling fluid), thus plugging micropores and minimizing the amount fluid loss through the filter cake.

It has been unexpectedly discovered that cloud point glycols can be included in drilling fluids, as described herein, to enhance initial fluid loss control of the drilling fluid as well as zinc contamination filtration control subsequent zinc contamination (e.g., to maintain fluid loss control in the presence of subsequently introduced treatment fluids that comprise zinc).

In embodiments, the CPG comprises a polyglycol, an alkoxylated (e.g., ethoxylated or propoxylated) alcohol (e.g., ethoxylated butanol), or a combination thereof. In embodiments, the CPG can comprise C3-C10 alcohol ethoxylates, C3-C10 alcohol propoxylates, C3-C10 alcohol alkoxylates, or a combination of two or more thereof. In embodiments, the CPG can comprise ethoxylated butanol, ethoxylated/propoxylated butanol, a mixture of (e.g., 60%) ethoxylated butanol and (e.g., 40%) ethoxylated/propoxylated butanol, or a combination thereof, available from Halliburton Energy Services, Inc., of Houston, Texas. The cloud point glycol may or may not be clouded out at room temperature in the base brine.

The concentration of the second fluid loss control additive (e.g., one or more CPG(s)) in a drilling fluid of this disclosure can range from about 0.1% w/v to about 10% w/v. The concentration can range from any lower limit to any upper limit and encompass any subset between the upper and lower limits. Some of the lower limits listed can be greater than some of the listed upper limits. One skilled in the art will recognize that the selected subset can include selection of an upper limit in excess of the selected lower limit. Therefore, it is to be understood that every range of values is encompassed within the broader range of values. For example, the concentration of the second fluid loss control additive in the drilling fluid of this disclosure can range from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the second fluid loss control additive in the drilling fluid of this disclosure can range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), from about 0.1% (w/v) to about 1% (w/v), or from about 0.1% (w/v) to about 0.5% (w/v). With the benefit of this disclosure, one of ordinary skill in the art will be readily able to prepare and select a second fluid loss control additive having a desirable concentration for use in a given drilling fluid.

In embodiments, the drilling fluid of this disclosure can further include one or more additional fluid loss control additives. For example, by way of non-limiting example, in embodiments, the drilling fluid of this disclosure can further comprise an additional fluid loss floss control additive. The additional fluid loss control additive can be or comprise a homopolymer, a cross-linked copolymer, or a combination thereof. In embodiments, the drilling fluid comprises an additional fluid loss control additive comprising a homopolymer or a cross-linked copolymer having 2-acrylamido-2-methylpropanesulfonic acid as a comonomer in a concentration of 50 mol % or greater. Generally, the additional fluid loss control additive additionally can comprise at least one second comononer comprising a N-vinyl amide-containing monomer, a terminal double bound-containing monomer, or any combination of an N-vinyl amide-containing monomer and a terminal double bound-containing monomer. More specifically, the additional fluid loss control additive can comprise at least one additional comonomer selected from the group including, but not limited to, N-vinylpyrrolidone, N-vinylamides (such as N-vinylformamide, N-vinylacetamide, N-vinyl-N-methylacetamide, N-vinylcaprolactam, and N-vinylpiperidone), acrylamide, methacrylamide, N-substituted acrylamides (such as N-methylacrylamide, N-ethylacrylamide, N-isopropylacrylamide, N,N-dimethylacrylamide, N-hydroxyethylacrylamide, diacetone acrylamide, methylol acrylamide, and dimethylaminopropyl acrylamide), methacrylamide, N-substituted methacrylamides (such as dimethylaminopropyl methacrylamide), acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-vinylamides (such as N-vinylformamide, N-vinylacetamide, and N-methyl-N-vinylacetamide), N-allylamides, vinyl alcohol, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates (such as sodium vinylsulfonate), allyl sulfonates, vinylimidazole, allylimidazole, allylamine, allyltrimethylammonium halide, diallylamine, diallyldimethylammonium chloride, and diallyldialkylammonium halide, additional monomer(s), or any combination thereof. The second comonomer or comonomers can be present in the additional fluid loss control additive copolymer in a total second comonomer concentration of 50 mol % or less.

The concentration of the additional fluid loss control additive(s) in a drilling fluid can range from about 0.1% w/v to about 10% w/v. The concentration can range from any lower limit to any upper limit and encompass any subset between the upper and lower limits. Some of the lower limits listed can be greater than some of the listed upper limits. One skilled in the art will recognize that the selected subset can include the selection of an upper limit in excess of the selected lower limit. Therefore, it is to be understood that every range of values is encompassed within the broader range of values. For example, the concentration of the additional fluid loss control additive in the drilling fluid can range from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the additional fluid loss control additive in the drilling fluid can range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), from about 0.1% (w/v) to about 1% (w/v), or from about 0.1% (w/v) to about 0.5% (w/v). With the benefit of this disclosure, one of ordinary skill in the art will be readily able to prepare and select an additional fluid loss control additive(s) having a desirable concentration for use in a given drilling fluid.

The first fluid loss control additive and/or the additional fluid loss control additive(s) comprise one or more crosslinkers. The crosslinkers may be any crosslinker having at least two olefinic bonds. Conjugated olefinic bonds may also be suitable (e.g., dienes). For example, the crosslinker may be a crosslinker having at least two vinyl groups; at least two allyl groups; at least two acrylate groups; at least two methacrylate groups; at least two acrylamide groups; at least two methacrylamide groups; and/or at least two groups from at least two of a vinyl group, an allyl group, an acrylate group, a methacrylate group, an acrylamide group, and a methacrylamide group. Any combination of these groups may also be used in forming the crosslinked polymer of the present disclosure.

Examples of suitable crosslinkers having at least two vinyl groups may include, but are not limited to, divinyl ether; a divinyl ester; a divinyl ether of a polyglycol; a divinyl ether of a polyol; a vinyl ether of a polyol; ethylene glycol divinyl ether; triethylene glycol divinyl ether; poly (ethylene glycol) divinyl ether; 1,3-divinyl-2-imidazolidinone; divinylbenzene; ethylidene pyrrolidone; ethylidene bis(N-vinylpyrrolidone); N-vinyl-3(E)-ethylidene pyrrolidone, and any combination thereof.

Examples of suitable crosslinkers having at least two allyl groups may include, but are not limited to, diallyl ether; a diallyl ester; an allyl ether of a polyglycol; an allyl ether of a polyol; triallyl amine; triallyl alkylammonium halide; tetraallylammonium halide; tetraallylethylene diamine; pentaerythritol allyl ether; trimethylolpropane diallyl ether; ethylene glycol diallyl ether; glycerol diallyl ether; triallyl-1,3,5-triazine-2,4,6-trione; 2,4,6-triallyloxy-1,3,5-triazine, and any combination thereof.

Examples of suitable crosslinkers having at least two acrylate groups may include, but are not limited to, ethylene glycol diacrylate; diethylene glycol diacrylate; triethylene glycol diacrylate; pentaerythritol triacrylate; pentaerythritol tetraacrylate; 1,1,1-trimethylolpropane triacrylate; 1,6-hexanediol diacrylate; and any combination thereof.

Examples of suitable crosslinkers having at least two methacrylate groups may include, but are not limited to, ethylene glycol dimethacrylate; poly(ethylene glycol) dimethacrylate; 1,1,1-trimethylolpropane trimethacrylate; pentaerythritol trimethacrylate; pentaerythritol tetramethacrylate; and any combination thereof.

Examples of suitable crosslinkers having at least two acylamide groups may include, but are not limited to, N,N'-substituted bisacrylamide; N,N'-methylenebis(acrylamide); and any combination thereof.

Examples of suitable crosslinkers having at least two methacrylamide groups may include, but are not limited to, N,N'-ethylenebis(2-methylacrylamide); 1,4-dimethacrylolpiperazine; N,N'-methylenebis(2-methylacrylamide); 1,6-hexamethylene bis(2-methylacrylamide); and any combination thereof. Examples of suitable crosslinkers having at least two groups from at least two of a vinyl group, an allyl group, an acrylate group, a methacrylate group, an acrylamide group, and a methacrylamide group may include, but are not limited to, an allyl acrylate (i.e., having an allyl group and an acrylate group); N,N-diallylacrylamide (i.e., having two allyl group and an acrylamide group); N-vinyl-3(E)-ethylidene pyrrolidone (i.e., having a vinyl group and an acrylamide group); and any combination thereof. The crosslinker can be present in the first fluid loss control additive and/or additional fluid loss control additive(s) in a concentration of about 0.05 mol % to about 15 mol % of the total monomeric units of the polymer(s).

The first fluid loss control additive and/or additional fluid loss control additive can be provided in the form of a dry powder or in the form of a water-in-oil emulsion, which can then be used, for example, to formulate a drilling fluid for use in a drilling operation. In the case of a water-in-oil emulsion, the first fluid loss control additive and/or additional fluid loss control additive can comprise a microgel dispersed in a continuous oil phase.

The first fluid loss control additive and/or second fluid loss control additive (and/or optional additional fluid loss control additive(s)) can provide desirable viscosity and fluid-loss control under well circulating conditions at temperatures of up to 260° C. (500° F.). In addition, the first fluid loss control additive and/or second fluid loss control additive (and/or optional additional fluid loss control additive(s)) can provide such desirable rheological properties without the need of clay being included in the drilling fluid.

The drilling fluids described herein comprise an aqueous base fluid, for example, freshwater, saltwater (e.g., water containing one or more salts dissolved therein), brine (e.g., saturated saltwater, including saturated saltwater produced from subterranean formations), seawater, or any combination thereof. Generally, the aqueous base fluid can be from any source provided that the aqueous base fluid does not contain an excess of compounds that can undesirably affect other components in the treatment fluid. In the case of brines, the aqueous base fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, zinc bromide brines, and the like. In embodiments, the brine can comprise calcium bromide, calcium chloride, calcium bromide/chloride mixture, calcium bromide/nitrate mixture, calcium chloride/nitrate mixture, calcium bromide/chloride/nitrate mixture, calcium bromide and zinc bromide mixture, and/or calcium bromide/nitrate and zinc bromide mixture. One of ordinary skill in the art, with the benefit of this disclosure, should be readily able to select an aqueous base fluid for a chosen application.

The concentration of the aqueous base fluid in the drilling fluid can range from about 1% (w/v) to about 99% (w/v). The concentration of the aqueous base fluid in the drilling fluid can range from any lower limit to any upper limit and encompass any subset between the upper and lower limits. Some of the lower limits listed can be greater than some of the listed upper limits. One skilled in the art will recognize that the selected subset can include the selection of an upper limit in excess of the selected lower limit. Therefore, it is to be understood that every range of values is encompassed within the broader range of values. For example, the concentration of the aqueous base fluid in the drilling fluid can range from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the drilling fluid can range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a treatment fluid having a sufficient concentration of an aqueous base fluid for a given application.

One or more dissolved salts can also be included in the drilling fluids. Where used, the dissolved salt can be included in the drilling fluid for many purposes, including, but not limited to, densifying a drilling fluid to a chosen density. A mixture of one or more dissolved salts can be used in some instances. Suitable dissolved salts can include monovalent and divalent salts, which can be used, for example, to form monovalent or divalent brines. Mixtures of monovalent and divalent salts can also be used. Suitable monovalent salts can include, but are not limited to, sodium chloride, sodium bromide, potassium bromide, potassium chloride, lithium chloride, sodium formate, potassium formate, cesium formate, and mixtures thereof among others. Suitable divalent salts can include, but are not limited to, calcium bromide, zinc bromide, calcium chloride, manganese bromide, manganese chloride, zinc chloride, calcium nitrate, calcium iodide, and mixtures thereof. In some examples, polyvalent salts can be included in the drilling fluid. An example of a suitable polyvalent salt is cerium nitrate.

Some examples of the drilling fluids can also include weighting agents to increase the density of the drilling fluids. By way of example, weighting agents can have a specific gravity of about 2 or higher (e.g., about 2, about 4, etc.). Suitable weighting agents can include, but are not limited to, calcium carbonate, magnesium carbonate, iron carbonate, hematite, ilmenite, hausmannite, barite, manganese tetroxide, or combinations thereof.

In some optional examples, the drilling fluids can further comprise one or more additives. The additive(s) can be used to adjust a property of the drilling fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, iron control agents, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a drilling fluid having properties suitable for a desired application.

The drilling fluids have a density suitable for a particular application. By way of example, the drilling fluids can have a density in a range of from about 9 pounds per gallon ("lb/gal") to about 20 lb/gal, in a range of from about 12 lb/gal to about 20 lb/gal, or in a range of from about 14 lb/gal to about 20 lb/gal. In embodiments, the drilling fluid of this disclosure can have a density of greater than or equal to about 9, 9.5, 10, 10.5, 11, 11.5, 12, 12.5, 13, 13.5, 14, 14.5, 16, or 16.5 lb/gal. With the benefit of this disclosure, those of ordinary skill in the art will readily recognize the appropriate density of a drilling fluid for a particular application. In embodiments, the drilling fluid of this disclosure can comprise a water-based, high-density (e.g., greater than or equal to about 9, 9.5, 10, 10.5, 11, 11.5, 12, 12.5, 13, 13.5, 14, 14.5, 16, or 16.5 lb/gal), acid soluble, high temperature high pressure (HTHP) drilling fluid.

Subsequent to the introduction of the drilling fluids disclosed herein, a brine comprising zinc can be introduced into the wellbore. The zinc-containing brine can be introduced as a treatment fluid for a variety of wellbore operations including, but not limited to, a screen running fluid and/or a gravel packing fluid. The zinc-containing brine can have a density of 14.5 lb/gal to about 20 lb/gal in embodiments. In some examples, the zinc content in the zinc-containing brine can range from about 3 wt. % to about 55 wt. % and encompassing any value(s) in between. Screen running fluids can be used after the well is drilled. The drilling fluid can first be displaced or modified to be a low/no solids drilling fluid. Then one or more sand screens can be introduced into the wellbore with the screen running fluid. The screen running fluid can be used to place the sand screens at a desired location. The screen running fluid can be heavier than the drilling fluid (e.g., 0.3-0.5 lb/gal more) and can be used after the drilling fluid. The screen running fluid is typically solids free, but can comprise solids for adjustment of the density and/or viscosity. A gravel packing fluid can be used to deliver sized sand that can act as a filter medium between the subterranean formation and a sand screen. The sand screens can be run alone (e.g., as with a standalone screen) or with the gravel depending on the well.

FIG. 1 illustrates a schematic of the preparation of a drilling fluid in accordance with the examples disclosed herein. A system 2 is used for the preparation of a drilling fluid and the delivery of the drilling fluid to a wellbore. As shown, the drilling fluid can be prepared by mixing an aqueous base fluid, a first fluid loss control additive, and a second fluid loss control additive in mixing equipment 4, which can be a jet mixer, re-circulating mixer, or a batch mixer. The drilling fluid can then be pumped via pumping equipment 6 to the wellbore. In some examples, the mixing equipment 4 and the pumping equipment 6 can be disposed on one or more mixing trucks as will be apparent to those of ordinary skill in the art. In some examples, a jet mixer can be used, for example, to continuously mix the first fluid loss control additive and the second fluid loss control additive with the aqueous base fluid as it is being pumped into the wellbore.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
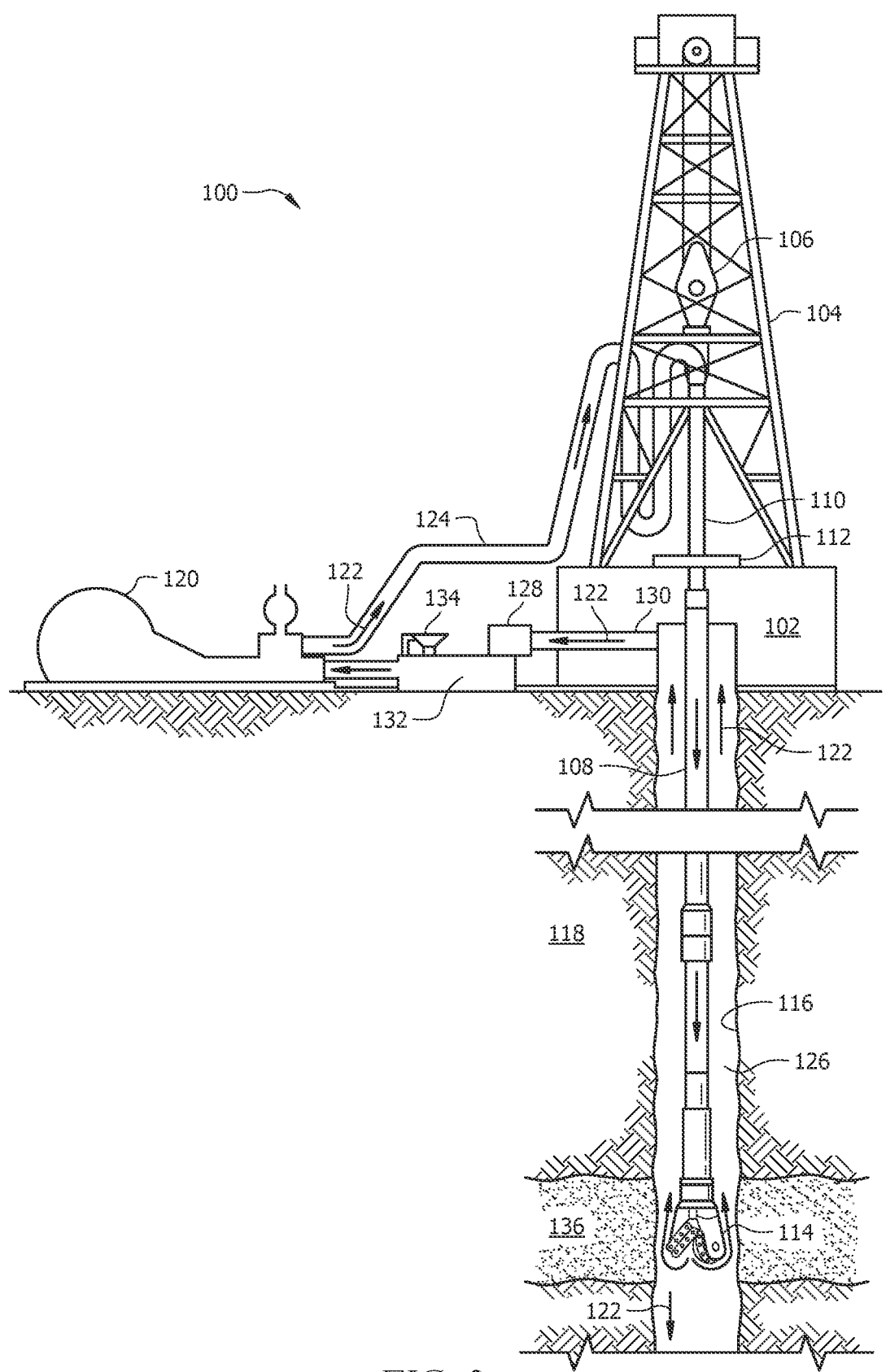
FIG. 2 illustrates a schematic of a drilling assembly in which a drilling fluid is used in accordance with one or more examples described herein.

FIG. 2 illustrates a schematic of a drilling assembly 100 in which a drilling fluid 122 as disclosed above can be used. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 can support the drill string 108 as it is lowered through a rotary table 112. A drill bit 114 can be attached to the distal end of the drill string 108 and can be driven either by a downhole motor and/or via rotation of the drill string 108 from the well surface. The drill bit 114 can include, but is not limited to, roller cone bits, PDC bits, natural diamond bits, any hole openers, reamers, coring bits, etc. As the drill bit 114 rotates, it can create a wellbore 116 that penetrates various subterranean formations 118. In an embodiment, the drill bit 114 can penetrate reservoir section 136 and a drilling fluid 122, as disclosed herein, can be circulated in the wellbore 116 during the drilling of the reservoir section 136.

The drilling fluid 122 comprises an aqueous base fluid, a first fluid loss control additive, and a second fluid loss control additive to enhance the formation of a filter cake on the wall of the wellbore 116. A pump 120 (e.g., a mud pump) can circulate the drilling fluid 122 through a feed pipe 124 and to the kelly 110, which conveys the drilling fluid 122 downhole through the interior of the drill string 108 and through one or more orifices in the drill bit 114 and into the wellbore 116 portion penetrating the reservoir section 136. The drilling fluid 122 can then be circulated back to the surface via an annulus 126 defined between the drill string 108 and the walls of the wellbore 116. As the drilling fluid 122 is circulated in the annulus 126, the first fluid loss control additive and the second fluid loss control additive can form a filter cake on the walls of the wellbore 116 to prevent the loss of the fluid portion of the drilling fluid 122 to the surrounding subterranean formation 118. At the surface, the recirculated or spent drilling fluid 122 can exit the annulus 126 and can be conveyed to one or more fluid processing unit(s) 128 via an interconnecting flow line 130. The fluid processing unit(s) 128 can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 can further include one or more sensors, gauges, pumps, compressors, and the like used store, monitor, regulate, and/or recondition the drilling fluid 122.

After passing through the fluid processing unit(s) 128, a "cleaned" drilling fluid 122 can be deposited into a nearby retention pit 132 (e.g., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the scope of the disclosure. One or more drilling fluid additives can be added to the drilling fluid 122 via a mixing hopper 134 communicably coupled to or otherwise in fluid communication with the retention pit 132. In some examples, the drilling fluid additives comprise additional amounts of the first and/or second fluid loss control additives (and/or additional fluid loss control additive(s)) that can be added to the foamed drilling fluid 122 via the mixing hopper. The mixing hopper 134 can include, but is not limited to, mixers and related mixing equipment known to those skilled in the art. Alternatively, the drilling fluid additives can be added to the drilling fluid 122 at any other location in the drilling assembly 100. While FIG. 2 shows only a single retention pit 132, there could be more than one retention pit 132, such as multiple retention pits 132 in series. Moreover, the retention pit 132 can be representative of one or more fluid storage facilities and/or units where the drilling fluid additives can be stored, reconditioned, and/or regulated until added to the drilling fluid 122.

After the introduction of the drilling fluid 122, a brine comprising zinc can be introduced into the wellbore 116. The zinc-containing brine can be used as screen running fluid or a gravel packing fluid. The zinc-containing brine can contact the filter cake formed by the drilling fluid 122. Due to the presence of the second fluid loss control additive in the formed filter cake, the filter cake can maintain its filtration control capability in the presence of the zinc-containing brine.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

In some alternative examples, the first or second fluid loss control additive could be added to a completion brine instead of or in addition to the drilling fluid. In some additional alternative examples, the first or second fluid loss control additive could be added to the drilling fluid as a nanoparticle. The nanoparticle could comprise a core-shell morphology where the core could be an inorganic material and the shell could be comprised of the first or second fluid loss control additive. The inorganic material that makes up the core could be an oxide including, but not limited to, titanium oxide, silicon oxide, calcium oxide, iron oxide, or any combination of materials.

To facilitate a better understanding of the present embodiments, the following examples of certain aspects of some embodiments are given. In no way should the following examples be read to limit, or define, the entire scope of the embodiments.

EXAMPLES

Example 1

Experiments were conducted to evaluate the effect of the second fluid loss control additive comprising a cloud point glycol on the filtration control of a drilling fluid comprising same. The second fluid loss control additive comprising CPG was added to a drilling fluid formulation (baseline drilling fluid #1) comprising the first fluid loss control additive to provide drilling fluid #2 as described herein, and as shown in Table 1. The first fluid loss control additive of this Example 1 comprised crosslinked polyvinylpyrrolidone polymer. Comparative drilling fluid #3 comprised the baseline fluid without the first fluid loss control additive, but comprising only the second fluid loss control additive (e.g., the CPG). The second fluid loss control additive comprised a polyethoxylated glycol CPG, as disclosed herein. The third drilling fluid #3 was also tested and its performance was measured and compared to the performance of the first/baseline drilling fluid #1, comprising only the first fluid loss control additive, and the second drilling fluid #2, comprising both the first fluid loss control additive and the second fluid loss control additive (e.g., the CPG). After mixing, each drilling fluid was hot-rolled at 280° F. for 16 hours. Fluid rheology was measured before and after hot-rolling at 120° F. with a FANN™ Model 45 viscometer.

TABLE 1

| Drilling Fluids with Additional Fluid Loss Control Additives (FLA) | | | |
|---|---|---|---|
| | HTHP Drill-in Fluids | | |
| | #1 (baseline) | #2 | #3 (comparative) |
| 14.2 lb/gal CaBr$_2$ brine (bbl) | 0.84 | 0.80 | 0.81 |
| Defoamer (lb/bbl) | 0.2 | 0.2 | 0.2 |
| First Fluid Loss Control Additive (lb/bbl) | 6 | 6 | — |
| Second Fluid Loss Control Additive (Cloud Point Glycol) (lb/bbl) | — | 12.0 | 12.0 |
| Alkalinity Agent (lb/bbl) | 3.0 | 3.0 | 3.0 |
| Bridging Agent 1 (lb/bbl) | 60.0 | 60.0 | 60.0 |
| Bridging Agent 2/Weighting Agent (lb/bbl) | 122 | 135.5 | 131.0 |
| Magnesium Peroxide (lb/bbl) | 1.0 | 1.0 | 1.0 |
| Oxygen Scavenger 1 (lb/bbl) | 0.1 | 0.1 | 0.1 |
| Oxygen Scavenger 2 (lb/bbl) | 0.5 | 0.5 | 0.5 |

| Hot-roll at 280° F. for 16 hours | | | | | | |
|---|---|---|---|---|---|---|
| Fluid Rheology @ 120° F. | | | | | | |
| | BHR | AHR | BHR | AHR | BHR | AHR |
| 600 rpm | 72 | 83 | 110 | 112 | 21 | 16.5 |
| 300 rpm | 45 | 56 | 75 | 76 | 11 | 10 |
| 200 rpm | 35 | 45 | 61 | 62 | 8 | 7 |
| 100 rpm | 24 | 32 | 44 | 45 | 5 | 4 |
| 6 rpm | 8 | 12 | 16 | 16 | 1 | 1 |
| 3 rpm | 7 | 11 | 14 | 15 | 1 | 1 |
| 10 sec gel (lb/100 ft$^2$) | 8 | 12 | 14 | 16 | 2 | 2 |
| 10 min gel (lb/100 ft$^2$) | 10 | 13 | 19 | 18 | 2 | 2 |
| Plastic Viscosity (cp) | 27 | 27 | 35 | 36 | 10 | 6.5 |
| Yield Point (lb/100 ft$^2$) | 18 | 29 | 40 | 40 | 1 | 3.5 |

BHR: Before hot-rolling;
AHR: After hot-rolling

As shown in Table 1, drilling fluid #2 of this disclosure comprising the second fluid loss control additive (e.g., the CPG) provided enhanced low end rheology (e.g., at 6 RPM, 3 RPM) relative to the baseline drilling fluid #1 not comprising the CPG and the comparative drilling fluid #3 which did not comprise the primary or first fluid loss control additive. It appears that the second fluid loss control additive alone provided little to no viscosity, as seen in the results for drilling fluid #3. It was thus unexpectedly discovered and surprising that adding the second fluid loss control additive (i.e., the cloud point glycol) to the baseline drilling fluid #1 comprising the first fluid loss control additive enhanced the viscosity relative to that of the baseline drilling fluid #1. In particular, as seen in Table 1, the low end rheology increased, which can improve cuttings removal, suspension and fluid stability.

Filter cake of the hot-rolled fluid was then built on a 12-micron ceramic disk at 500 psi differential pressure and 280° F. for 16 hours. The filtrate was collected in a graduated cylinder and recorded as the initial fluid loss without multiplying the volume by two.

Figure 3:
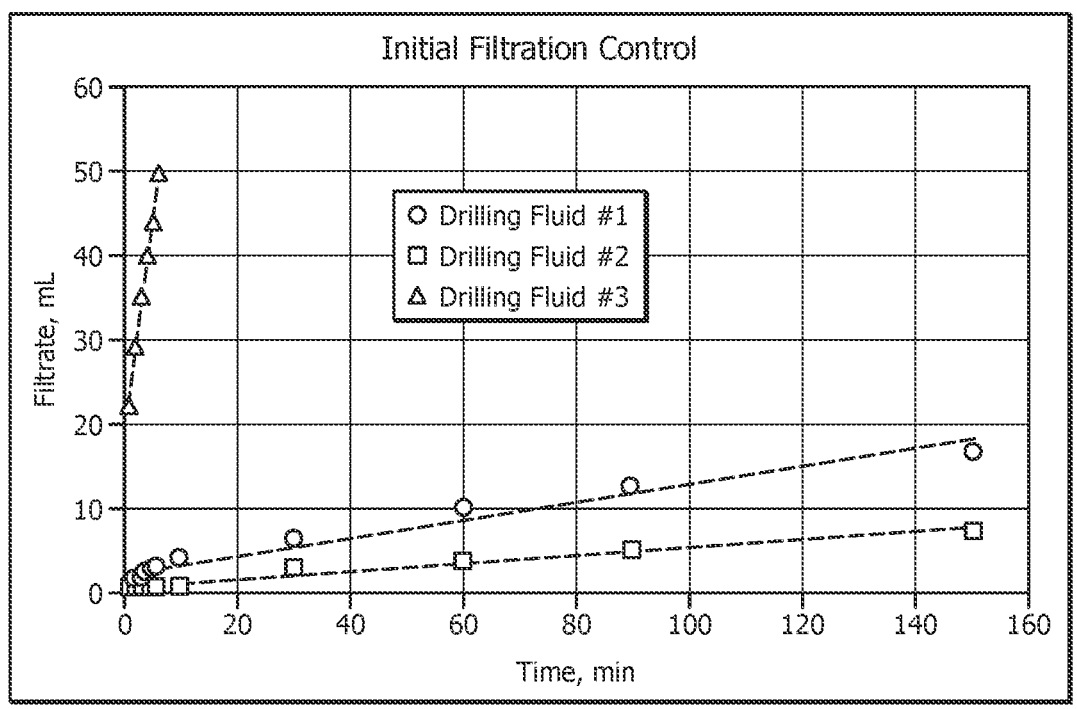
FIG. 3 is a plot of the initial filtration control as a function of time obtained from drilling fluids of Example 1.

FIG. 3 is a plot of the initial filtration control (e.g., filtrate (mL) as a function of time (min)), obtained from baseline drilling fluid #1, drilling fluid #2, and drilling fluid #3. As seen in FIG. 3, the second additive provides enhanced filtration control (e.g., reduced filtrate) to drilling fluid #2 relative to the baseline drilling fluid #1. This result is surprising in view of the fact that the second fluid loss control additive (e.g., CPG) itself (i.e., in the absence of the primary additive) failed to provide any significant initial filtration control to comparative drilling fluid #3, as seen in FIG. 3.

Example 2

In this Example 2, a disparate baseline drilling fluid #4 was tested, along with an inventive drilling fluid #5 of this disclosure comprising a second fluid loss control additive (e.g., CPG), as detailed herein. Tests (e.g., rheology and filtration tests) were performed as described in Example 1 hereinabove with one additional test. Both the initial filtration control and zinc contamination filtration control were studied. The "initial filtration control" indicates prevention of fluid loss prior to exposure of the filter cake to zinc-containing fluid and "zinc contamination filtration control" indicates prevention of fluid loss subsequent exposure of the filter cake to zinc-containing fluid to examine the zinc tolerance provided by the drilling fluid. The compositions of drilling fluid #4 and drilling fluid #5 are provided in Table 2. Both baseline drilling fluid #4 and drilling fluid #5 contained the same primary/first fluid loss control additive as described hereinabove and utilized in Example 1. The second fluid loss control additive utilized in drilling fluid #5 is the same as utilized in Example 1 above.

As seen in Table 2, both baseline drilling fluid #4 and inventive drilling fluid #5 comprising the second fluid loss control additive comprising the cloud point glycol provided good (and similar) rheology. Baseline drilling fluid #4 provided initial filtration of 22 mL of fluid loss in 16 hours, while drilling fluid #5 exhibited only 10 mL filtrate in 16 hours. Thus drilling fluid #5 of this disclosure comprising the CPG showed enhanced initial filtration control relative to the baseline drilling fluid #4 in this Example 2. Furthermore, baseline drilling fluid #4 provided zinc contamination filtrate of greater than 100 mL in 16 hours, while drilling fluid #5 of this disclosure exhibited only 7 mL of filtrate in 16 hours after exposure to zinc. Thus inventive drilling fluid #5 comprising the CPG showed enhanced zinc contamination filtration control relative to the baseline drilling fluid #4 in this Example 2. Thus, as with Example 1 in the $CaBr_2$ brine, in the $CaBr_2$-based brine of Example 2, the addition of the second fluid loss control additive again increased viscosity and lowered initial fluid loss. Further, the addition of the second fluid loss control additive exhibited better resistance to zinc contamination.

propoxylated butanol CPG as the second fluid loss control additive; and drilling fluid #9, which is a drilling fluid of this disclosure, comprised ethoxylated butanol and ethoxylated/propoxylated butanol CPGs as the second fluid loss control additive. The second fluid loss control additive of drilling fluid #9 comprised 60% of the second fluid loss control additive of drilling fluid #7 and 40% of the second fluid loss control additive of drilling fluid #8.

Tests (e.g., rheology and filtration tests) were performed as described in Example 2 hereinabove. The compositions of drilling fluids 6-9 of this Example 3 and the results thereof are provided in Table 3.

As seen in Table 3, the four drilling fluids #6-#9 provided similar rheology. The baseline drilling fluid #6 provided greater than 100 mL of filtrate in 16 hours, while each of the

TABLE 2

Drilling Fluids with Additional Fluid Loss Control Additives (FLA)

| | HTHP Drill-in Fluids | |
| --- | --- | --- |
| | #4 (baseline) | #5 |
| 14.8 lb/gal $CaBr_2$-Based brine (bbl) | 0.81 | 0.81 |
| Defoamer (lb/bbl) | 0.2 | 0.2 |
| First Fluid Loss Control Additive (lb/bbl) | 5.0 | 5.0 |
| Second Fluid Loss Control Additive (Cloud Point Glycol) (lb/bbl) | — | 12.0 |
| Additional Fluid Loss Control Additive (lb/bbl) | 4.0 | 4.0 |
| Alkalinity Agent (lb/bbl) | 3.0 | 3.0 |
| Bridging Agent 1 (lb/bbl) | 60.0 | 60.0 |
| Bridging Agent 2 (lb/bbl) | 60.0 | 60.0 |
| Bridging Agent 3 (lb/bbl) | 60.0 | 60.0 |
| Magnesium Peroxide (lb/bbl) | 1.0 | 1.0 |
| Oxygen Scavenger 1 (lb/bbl) | 0.1 | 0.1 |
| Oxygen Scavenger 2 (lb/bbl) | 0.5 | 0.5 |

Hot-roll at 280° F for 16 hours

| | Fluid Rheology @ 120° F. | | | |
| --- | --- | --- | --- | --- |
| | BHR | AHR | BHR | AHR |
| 600 rpm | 137 | 209 | 185 | 234 |
| 300 rpm | 81 | 133 | 116 | 149 |
| 200 rpm | 60 | 102 | 89 | 111 |
| 100 rpm | 37 | 66 | 59 | 70 |
| 6 rpm | 10 | 15 | 18 | 15 |
| 3 rpm | 9 | 12 | 16 | 12 |
| 10 sec gel (lb/100 $ft^2$) | 10 | 14 | 17 | 11 |
| 10 min gel (lb/100 $ft^2$) | 17 | 21 | 30 | 22 |
| Plastic Viscosity (cp) | 56 | 76 | 69 | 85 |
| Yield Point (lb/100 $ft^2$) | 25 | 57 | 47 | 64 |
| Initial fluid loss after building filter cake at 280° F. for 16 hours | | | | |
| HTHP filtrate (mL) | 22/16 hours | | 10/16 hours | |
| Final fluid loss with 16.5 lb/gal $ZnBr_2$/$CaBr_2$ brine on top of filter cake at 280° F. | | | | |
| HTHP filtrate (mL) | >100/16 hours | | 7/16 hours | |

BHR: Before hot-rolling;
AHR: After hot-rolling

Example 3

In this Example 3, three different second fluid loss control additives were incorporated into the drilling fluid of this disclosure and studied and the results compared to those obtained from a baseline drilling fluid. The baseline drilling fluid #6 did not comprise a second fluid loss control additive of this disclosure (i.e., did not comprise a cloud point glycol). Drilling fluid #7, which is a drilling fluid of this disclosure, comprised ethoxylated butanol CPG as the second fluid loss control additive; drilling fluid #8, which is a drilling fluid of this disclosure, comprised ethoxylated/ drilling fluids of this disclosure (e.g., drilling fluid #7, drilling fluid #8, and drilling fluid #9) exhibited enhanced initial filtration performance (e.g., before exposure to zinc containing fluid). With final fluid loss higher than 100 mL within 16 hours, it appears that the baseline drilling fluid #6 quickly lost its filtration control. Inventive drilling fluid #7 of this disclosure provided just 18 mL of filtrate in 16 hours, inventive drilling fluid #8 exhibited 14 mL of filtrate in 16 hours, and inventive drilling fluid 9 of this disclosure produced 15 mL of filtrate in 16 hours. Accordingly, the drilling fluids #7, #8, and #9, each comprising a second fluid loss control additive of this disclosure, substantially improved the initial filtration control relative to the baseline drilling fluid #6 not comprising the second fluid loss control additive of this disclosure.

Additionally, each of the inventive drilling fluids (drilling fluid #7, drilling fluid #8, and drilling fluid #9 comprising a second fluid loss control additive of this disclosure) exhibited enhanced zinc contamination filtration control relative to the baseline drilling fluid #6 absent the second fluid loss control additive of this disclosure. Indeed, the baseline drilling fluid #6 was not tested for resistance to zinc-containing fluid, as baseline drilling fluid #6 indeed failed to provide fluid loss control during the initial filtration testing. As a result of the zinc contamination testing, when the zinc-containing brine was added on top of the filter cake, inventive drilling fluid #7 of this disclosure provided a filtrate of 7 mL in 16 hours, inventive drilling fluid #8 provided a filtrate of 50 mL in 16 hours, and inventive drilling fluid #9 of this disclosure provided 7 mL of filtrate in 16 hours.

TABLE 3

Drilling Fluids with Various CPGs

| | HTHP Drill-in Fluids | | | |
|---|---|---|---|---|
| | #6 (baseline) | #7 | #8 | #9 |
| 14.8 lb/gal $CaBr_2$-Based brine (bbl) | 0.81 | 0.81 | 0.81 | 0.81 |
| Defoamer (lb/bbl) | 0.2 | 0.2 | 0.2 | 0.2 |
| First Fluid Loss Control Additive (lb/bbl) | 3.0 | 3.0 | 3.0 | 3.0 |
| Second Fluid Loss Control Additive 1 (Cloud Point Glycol 1) (lb/bbl) | — | 12.0 | — | — |
| Second Fluid Loss Control Additive 2 (Cloud Point Glycol 2) (lb/bbl) | — | — | 12.0 | — |
| Second Fluid Loss Control Additive 3 (Cloud Point Glycol 3) (lb/bbl) | — | — | — | 12.0 |
| Additional Fluid Loss Control Additive (lb/bbl) | 4.0 | 4.0 | 4.0 | 4.0 |
| Alkalinity Agent (lb/bbl) | 3.0 | 3.0 | 3.0 | 3.0 |
| Bridging Agent 1 (lb/bbl) | 60.0 | 60.0 | 60.0 | 60.0 |
| Bridging Agent 2 (lb/bbl) | 60.0 | 60.0 | 60.0 | 60.0 |
| Bridging Agent 3 (lb/bbl) | 60.0 | 60.0 | 60.0 | 60.0 |
| Magnesium Peroxide (lb/bbl) | 1.0 | 1.0 | 1.0 | 1.0 |
| Oxygen Scavenger 1 (lb/bbl) | 0.1 | 0.1 | 0.1 | 0.1 |
| Oxygen Scavenger 2 (1lb/bbl) | 0.5 | 0.5 | 0.5 | 0.5 |

Hot-roll at 280° F. for 16 hours

| | Fluid Rheology @ 120° F. | | | | | | | |
|---|---|---|---|---|---|---|---|---|
| | BHR | AHR | BHR | AHR | BHR | AHR | BHR | AHR |
| 600 rpm | 88 | 120 | 111 | 150 | 104 | 138 | 113 | 152 |
| 300 rpm | 49 | 66 | 63 | 87 | 61 | 79 | 66 | 87 |
| 200 rpm | 36 | 48 | 47 | 64 | 45 | 57 | 49 | 63 |
| 100 rpm | 21 | 27 | 29 | 38 | 30 | 33 | 30 | 37 |
| 6 rpm | 4 | 5 | 6 | 8 | 5 | 6 | 6 | 7 |
| 3 rpm | 3 | 4 | 5 | 7 | 4 | 5 | 5 | 6 |
| 10 sec gel (lb/100 $ft^2$) | 4 | 5 | 7 | 7 | 6 | 5 | 7 | 6 |
| 10 min gel (lb/100 $ft^2$) | 10 | 12 | 12 | 14 | 10 | 13 | 14 | 14 |
| Plastic Viscosity (cp) | 39 | 54 | 48 | 63 | 43 | 59 | 47 | 65 |
| Yield Point (lb/100 $ft^2$) | 10 | 12 | 15 | 24 | 18 | 20 | 19 | 22 |
| Initial fluid loss after building filter cake at 280° F. for 16 hours | | | | | | | | |
| HTHP filtrate (mL) | > 100/16 hours | | 18/16 hours | | 14/16 hours | | 15/16 hours | |
| Final fluid loss with 16.5 lb/gal $ZnBr_2/CaBr_2$ brine on top of filter cake at 280° F. | | | | | | | | |
| HTHP filtrate (mL) | DNT | | 7/16 hours | | 50/16 hours | | 7/16 hours | |

BHR: Before hot-rolling;
AHR: After hot-rolling;
DNT: Did Not Test

Example 4

In this Example 4, another baseline drilling fluid (e.g., drilling fluid #10) comprising the first fluid loss additive of Examples 1-3, was compared with a drilling fluid #11 of this disclosure comprising the second fluid loss additive of Example 1. The compositions of baseline drilling fluid #10 and inventive drilling fluid #11 of this disclosure and the results of the tests (e.g. rheology and filtration tests, as described in Example 2) are shown in Table 4.

TABLE 4

Drilling Fluids with Cloud Point Glycol

| | HTHP Drill-in Fluids | |
|---|---|---|
| | #10 (baseline) | #11 |
| 14.2 lb/gal CaBr$_2$ brine (bbl) | 0.84 | 0.80 |
| Defoamer (lb/bbl) | 0.2 | 0.2 |
| First Fluid Loss Control Additive (lb/bbl) | 4.0 | 4.0 |
| Second Fluid Loss Control Additive (Cloud Point Glycol) (lb/bbl) | 0.0 | 10.0 |
| Additional Fluid Loss Control Additive (lb/bbl) | 2.0 | 2.0 |
| Alkalinity Agent (lb/bbl) | 3.0 | 3.0 |
| Bridging Agent 1 (lb/bbl) | 60.0 | 60.0 |
| Bridging Agent 2 (lb/bbl) | 125.0 | 125.0 |
| Magnesium Peroxide (lb/bbl) | 1.0 | 1.0 |
| Oxygen Scavenger 1 (lb/bbl) | 0.1 | 0.1 |
| Oxygen Scavenger 2 (lb/bbl) | 0.5 | 0.5 |

Hot-roll at 280° F. for 16 hours

| | Fluid Rheology @ 120° F. | | | |
|---|---|---|---|---|
| | BHR | AHR | BHR | AHR |
| 600 rpm | 64 | 76 | 107 | 104 |
| 300 rpm | 41 | 51 | 76 | 70 |
| 200 rpm | 33 | 40 | 63 | 56 |
| 100 rpm | 23 | 29 | 48 | 39 |
| 6 rpm | 8 | 9 | 22 | 11 |
| 3 rpm | 7 | 8 | 19 | 10 |
| 10 sec gel (lb/100 ft$^2$) | 9 | 9 | 19 | 9 |
| 10 min gel (lb/100 ft$^2$) | 12 | 14 | 25 | 14 |
| Plastic Viscosity (cp) | 23 | 25 | 31 | 34 |
| Yield Point (lb/100 ft$^2$) | 18 | 26 | 45 | 36 |

Initial fluid loss after building filter cake at 280° F. for 16 hours

| | | |
|---|---|---|
| HTHP filtrate (mL) | 22/2.5 hours | 26/16 hours |

Final fluid loss with 16.5 lb/gal ZnBr$_2$/CaBr$_2$ brine on top of filter cake at 280° F.

| | | |
|---|---|---|
| HTHP filtrate (mL) | DNT | 16/16 hours |

BHR: Before hot-rolling;
AHR: After hot-rolling;
DNT: Did Not Test

Again, the inventive drilling fluid #11 comprising the CPG exhibited increased viscosity, increased low end viscosity, and improved filtration control relative to the baseline drilling fluid (e.g., baseline drilling fluid #10). The initial filtration results showed 22 mL in 2.5 hours for the baseline drilling fluid #10, while the inventive drilling fluid #11 of this disclosure provided 26 mL in 16 hours. Thus, the baseline fluid #10 absent the second fluid loss control additive of this disclosure failed to provide initial fluid loss control and was not tested further for zinc contamination resistance. Furthermore, the inventive drilling fluid #11 of this disclosure was tested for resistance after exposure of the filter cake to when the zinc-containing brine, and provided just 16 mL of filtrate in 16 hours, thus providing zinc contamination filtration control in addition to enhanced initial filtration control and rheology.

Examples 1-4 thus confirm that the combination of a first fluid loss additive of this disclosure (e.g., polyvinylpyrrolidone) and a cloud point glycol can provide improved rheology and fluid loss control in high-density CaBr$_2$ or CaBr$_2$-based brine.

The drilling fluids disclosed herein can directly or indirectly affect one or more components or pieces of equipment associated with or which can come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are drilling fluids for drilling a wellbore in accordance with the disclosure and the illustrated FIGs. An example drilling fluid comprises an aqueous base fluid, a first fluid loss control additive that comprises a cross-linked polymer comprising N-vinylpyrrolidone as a monomer, and a second fluid loss control additive that comprises a (one or more) cloud point glycol.

Additionally or alternatively, the drilling fluids can include one or more of the following features individually or in combination. The aqueous base fluid can be a divalent brine. The divalent brine can comprise a divalent salt selected from the group consisting of calcium bromide, calcium chloride, calcium nitrate, calcium iodide, and any combination thereof. The first fluid loss control additive can comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The first fluid loss control additive can be a homopolymer of cross-linked polyvinylpyrrolidone. The first fluid loss control additive can be present in the drilling fluid in a concentration of about 0.1% to about 10% w/v of the drilling fluid. The second fluid loss control additive can be present in the drilling fluid in a concentration of about 0.1% to about 10% w/v of the drilling fluid. The drilling fluid can have a density of about 9 lb/gal to about 20 lb/gal.

Provided are methods for drilling a wellbore with a drilling fluid in accordance with the disclosure and the illustrated FIGs. An example method comprises providing a drilling fluid comprising an aqueous base fluid, a first fluid loss control additive that comprises a cross-linked polymer comprising N-vinylpyrrolidone as a monomer, and a second fluid loss control additive that comprises a (one or more) cloud point glycol. The method can additionally comprise drilling a wellbore through at least a portion of a subterranean formation with the drilling fluid.

Additionally or alternatively, the method can include one or more of the following features individually or in combination. The method can further comprise introducing a brine into the wellbore after the drilling fluid is introduced into the wellbore; wherein the brine comprises zinc. The zinc-containing brine can be a screen running fluid or a gravel packing fluid. The zinc-containing brine can have a density of about 14 lb/gal to about 20 lb/gal. The subterranean formation can comprise a reservoir comprising a hydrocarbon; wherein the wellbore is drilled through at least a portion of the reservoir; wherein the drilling fluid is circulated in the wellbore during the drilling of the reservoir. The aqueous base fluid can be a divalent brine. The divalent brine can comprise a divalent salt selected from the group consisting of calcium bromide, calcium chloride, calcium nitrate, calcium iodide, and any combination thereof. The first fluid loss control additive can comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The first fluid loss control additive can be a homopolymer of cross-linked polyvinylpyrrolidone. The first fluid loss control additive can be present in the drilling fluid in a concentration of about 0.1% to about 10% w/v of the drilling fluid. The second fluid loss control additive can be present in the drilling fluid in a concentration of about 0.1% to about 10% w/v of the drilling fluid. The drilling fluid can have a density of about 9 lb/gal to about 20 lb/gal.

Provided are systems for drilling a wellbore with a drilling fluid in accordance with the disclosure and the illustrated FIGs. An example system comprises a drilling fluid. The drilling fluid comprises an aqueous base fluid, a first fluid loss control additive that comprises a cross-linked polymer comprising N-vinylpyrrolidone as a monomer, and a second fluid loss control additive that a (one or more) cloud point glycol. The system can further comprise mixing equipment configured to mix the aqueous base fluid, the first fluid loss control additive, and the second fluid loss control additive and pumping equipment configured to pump the drilling fluid in the wellbore.

Additionally or alternatively, the system can include one or more of the following features individually or in combination. The system can further comprise a drill string and a drill bit; wherein the drilling fluid is pumped through the drill string and the drill bit. The aqueous base fluid can be a divalent brine. The divalent brine can comprise a divalent salt selected from the group consisting of calcium bromide, calcium chloride, calcium nitrate, calcium iodide, and any combination thereof. The first fluid loss control additive can comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The first fluid loss control additive can be a homopolymer of cross-linked polyvinylpyrrolidone. The first fluid loss control additive can be present in the drilling fluid in a concentration of about 0.1% to about 10% w/v of the drilling fluid. The second fluid loss control additive can be present in the drilling fluid in a concentration of about 0.1% to about 10% w/v of the drilling fluid. The drilling fluid can have a density of about 9 lb/gal to about 20 lb/gal.

The preceding description provides various examples of the systems and methods of use disclosed herein which can contain different method steps and alternative combinations of components. It should be understood that, although individual examples can be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems (e.g., drilling fluids, fluid loss control additives, etc.) and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit can be combined with any upper limit to recite a range not explicitly recited, as well as ranges from any lower limit can be combined with any other lower limit to recite a range not explicitly recited. In the same way, ranges from any upper limit can be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value can serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure can be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above can be altered, combined, or modified, and all such variations are considered within the scope of the present disclosure. The systems and methods illustratively disclosed herein can suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

In embodiments, the herein disclosed drilling fluids combine water-based HTHP polymers with cloud-point glycols in high-density brines to provide enhanced zinc contamination resistance.

Via this disclosure a second fluid loss control additive comprising a cloud point glycol can enhance the zinc compatibility of a baseline drilling fluid comprising a first fluid loss control additive comprising a cross-linked polymer comprising N-vinylpyrrolidone as a monomer (e.g., cross-linked polyvinylpyrrolidone). While the first fluid loss control additive polymer can provide good fluid loss control, the filter cake of a baseline fluid comprising the first fluid loss control additive and lacking the second fluid loss control additive can quickly lose its filtration control capability once in contact with very high-density zinc-containing brines (e.g., above 14.5 lb/gal). Without being limited by theory, this incompatibility can be due to the precipitation of the first fluid loss control additive in the presence of zinc-containing brines. High-density zinc-containing brines are used on top of the filter cake formed by various drilling fluids as screen running fluid (SRF) and/or open-hole gravel packing fluid (OHGP). Thus, additives, such as the herein disclosed second fluid loss control additive, are incorporated into the drilling fluid of this disclosure to improve the drilling fluid properties, such as zinc resistance, of the filter cake formed via the drilling fluid. Accordingly, drilling fluids of this disclosure can be very useful in wellbore operations. The herein disclosed second fluid loss control additive can improve the fluid loss control of drilling fluids when hydrated in (e.g., $CaBr_2$ or $CaBr_2$-based brines and when subsequently exposed to zinc-containing fluid (e.g., $ZnBr_2$ brine).

The drilling fluid of this disclosure can be a water-based, high-density (e.g., greater than or equal to about 9.5, 10, 10.5, 11, 11.5, 12, 12.5, 13, 13.5, 14, 14.5, 16, or 16.5 lb/gal), acid soluble, and/or HTHP drill-in fluid with improved rheology and/or fluid loss control (e.g., initial filtration control and/or zinc contamination filtration control as discussed in the Examples hereinabove). In embodiments, the drilling fluid of this disclosure comprises a first fluid loss control additive comprising cross-linked polyvinylpyrrolidone and a second fluid loss control additive comprising a (one or more) cloud point glycol in a high-density brine-based drilling/drill-in fluid.

While several embodiments have been provided in the present disclosure, it should be understood that the disclosed systems and methods can be embodied in many other specific forms without departing from the spirit or scope of the present disclosure. The present examples are to be considered as illustrative and not restrictive, and the intention is not to be limited to the details given herein. For example, the various elements or components can be combined or integrated in another system or certain features can be omitted or not implemented.

Also, techniques, systems, subsystems, and methods described and illustrated in the various embodiments as discrete or separate can be combined or integrated with other systems, modules, techniques, or methods without departing from the scope of the present disclosure. Other items shown or discussed as directly coupled or communicating with each other can be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

ADDITIONAL DISCLOSURE

The following are non-limiting, specific embodiments in accordance with the present disclosure:

In a first embodiment, a drilling fluid for drilling a wellbore, the drilling fluid comprises: an aqueous base fluid; a first fluid loss control additive comprising a cross-linked polymer comprising N-vinylpyrrolidone as a monomer; and a second fluid loss control additive comprising a cloud point glycol.

A second embodiment can include the drilling fluid of the first embodiment, wherein the first fluid loss control additive comprises a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof.

A third embodiment can include the drilling fluid of the first or second embodiment, wherein the first fluid loss control additive is a homopolymer of cross-linked polyvinylpyrrolidone or a cross-linked copolymer comprising a first comonomer of N-vinylpyrrolidone in a first comonomer concentration of at least 90 mol % of the copolymer; wherein the second fluid loss control additive additionally comprises a second comonomer comprising acrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium chloride, and diallyldialkylammonium halide, or any combination thereof.

A fourth embodiment can include the drilling fluid of any one of the first to third embodiments, wherein the first fluid loss control additive is present in the drilling fluid in a concentration of about 0.1% to about 10% w/v of the drilling fluid.

A fifth embodiment can include the drilling fluid of any one of the first to fourth embodiments, wherein the cloud point glycol comprises ethoxylated butanol, C3-C10 alcohol ethoxylates, C3-C10 alcohol propoxylates, and C3-C10 alcohol alkoxylates, or a combination thereof.

A sixth embodiment can include the drilling fluid of any one of the first to fifth embodiments, wherein the second fluid loss control additive is present in the drilling fluid in a concentration of about 0.1% to about 10% w/v of the drilling fluid.

A seventh embodiment can include the drilling fluid of any one of the first to sixth embodiments, wherein the aqueous base fluid is a divalent brine.

An eighth embodiment can include the drilling fluid of the seventh embodiment, wherein the divalent brine comprises a divalent salt selected from the group consisting of calcium bromide, calcium chloride, calcium nitrate, calcium iodide, and any combination thereof.

A ninth embodiment can include the drilling fluid of any one of the first to eighth embodiments, wherein the drilling fluid has a density of about 9 lb/gal to about 20 lb/gal.

A tenth embodiment can include the drilling fluid of any one of the first to ninth embodiments, wherein the drilling fluid has a density of greater than or equal to about 9, 9.5, 10, 10.5, 11, 11.5, 12, 12.5, 13, 13.5, 14, 14.5 lb/gal and leas than or equal to about 20 lb/gal.

An eleventh embodiment can include the drilling fluid of any one of the first to tenth embodiments further comprising an additional fluid loss control additive.

A twelfth embodiment can include the drilling fluid of the eleventh embodiment, wherein the additional fluid loss control additive comprises a cross-linked copolymer comprising a first comonomer of 2-acrylamido-2-methylpropanesulfonic acid in a first comonomer concentration of at least 50 mol % of the copolymer; wherein the second fluid loss control additive additionally comprises a second comonomer comprising an N-vinyl amide-containing monomer, a terminal double bound-containing monomer, or a combination of an N-vinyl amide-containing monomer and a terminal double bound-containing monomer; wherein the second comonomer is present in a total second comonomer concentration of 50 mol % or less of the copolymer.

A thirteenth embodiment can include the drilling fluid of the twelfth embodiment, wherein the second comonomer of the additional fluid loss control additive is a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination thereof.

A fourteenth embodiment can include the drilling fluid of the twelfth or thirteenth embodiment, wherein the additional fluid loss control additive comprises a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallyammonium halide, tetraallylethylene diamine, N-vinyl-3(E)-ethylidene pyrrolidone, ethylidene bis(N-vinylpyrrolidone), and any combination thereof.

A fifteenth embodiment can include the drilling fluid of any one of the twelfth to fourteenth embodiments, wherein the additional fluid loss control additive is present in the drilling fluid in a concentration of about 0.1% to about 10% w/v of the drilling fluid.

In a sixteenth embodiment, a method for drilling a wellbore in a subterranean formation, the method comprises: providing a drilling fluid comprising: an aqueous base fluid; a first fluid loss control additive that comprises a cross-linked polymer comprising N-vinylpyrrolidone as a monomer; and a second fluid loss control additive that comprises a cloud point glycol; and drilling a wellbore through at least a portion of a subterranean formation with the drilling fluid.

A seventeenth embodiment can include the method of the sixteenth embodiment further comprising introducing a brine into the wellbore after the drilling fluid is introduced into the wellbore; wherein the brine comprises zinc.

An eighteenth embodiment can include the method of the seventeenth embodiment, wherein the zinc-containing brine is a screen running fluid or a gravel packing fluid.

A nineteenth embodiment can include the method of the seventeenth or eighteenth embodiment, wherein the zinc-containing brine has a density of about 14 lb/gal to about 20 lb/gal.

A twentieth embodiment can include the method of any one of the sixteenth to nineteenth embodiments, wherein the subterranean formation comprises a reservoir comprising a hydrocarbon; wherein the wellbore is drilled through at least a portion of the reservoir; wherein the drilling fluid is circulated in the wellbore during the drilling of the reservoir.

In a twenty first embodiment, a system for drilling a wellbore comprises: a drilling fluid comprising: an aqueous base fluid; a first fluid loss control additive that comprises a cross-linked polymer comprising N-vinylpyrrolidone as a monomer; and a second fluid loss control additive that comprises a cloud point glycol; mixing equipment configured to mix the aqueous base fluid, the first fluid loss control additive, and the second fluid loss control additive; and pumping equipment configured to pump the drilling fluid in the wellbore.

A twenty second embodiment can include the system of the twenty first embodiment further comprising a drill string and a drill bit; wherein the drilling fluid is pumped through the drill string and the drill bit.

A twenty third embodiment can include the system of the twenty first or twenty second embodiment further comprising a brine comprising zinc.

A twenty fourth embodiment can include the system of any one of the twenty first to twenty third embodiments, wherein the first fluid loss control additive is a homopolymer of cross-linked polyvinylpyrrolidone.

A twenty fifth embodiment can include the system of any one of the twenty first to twenty fourth embodiments, wherein the second fluid loss control additive comprises ethoxylated butanol, C3-C10 alcohol ethoxylates, C3-C10 alcohol propoxylates, and C3-C10 alcohol alkoxylates, or a combination thereof.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=R1+k*(Ru–Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method for drilling a wellbore in a subterranean formation, the method comprising:
providing a drilling fluid comprising:
an aqueous base fluid;
a first fluid loss control additive that comprises a cross-linked polymer comprising N-vinylpyrrolidone as a monomer; and
a second fluid loss control additive that comprises a cloud point glycol;
drilling a wellbore through at least a portion of a subterranean formation with the drilling fluid, whereby a filter cake is formed; and
introducing a brine into the wellbore after the drilling fluid is introduced into the wellbore, wherein the brine comprises zinc,
wherein the drilling fluid comprises the second fluid loss control additive in a concentration of about 0.1% to about 10% w/v of the drilling fluid, such that the filter cake formed during the drilling exhibits enhanced filtration control capability in the presence of the subsequently introduced zinc-containing brine than a filter cake produced during drilling with an otherwise identical drilling fluid absent the second fluid loss control additive.

2. The method of claim 1, wherein the zinc-containing brine is a screen running fluid or a gravel packing fluid.

3. The method of claim 1, wherein the zinc-containing brine has a density of about 14 lb/gal to about 20 lb/gal.

4. The method of claim 1, wherein the subterranean formation comprises a reservoir comprising a hydrocarbon; wherein the wellbore is drilled through at least a portion of the reservoir; and wherein the drilling fluid is circulated in the wellbore during the drilling of the reservoir.

5. The method of claim 1, wherein the first fluid loss control additive comprises a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof.

6. The method of claim 1, wherein the first fluid loss control additive is a homopolymer of cross-linked polyvinylpyrrolidone, or a cross-linked copolymer comprising a first comonomer of N-vinylpyrrolidone in a first comonomer concentration of at least 90 mol % of the copolymer and a second comonomer in a second comonomer concentration of less than 10 mol % of the copolymer, wherein the second comonomer comprises acrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium chloride, and diallyldialkylammonium halide, or any combination thereof.

7. The method of claim 1, wherein the first fluid loss control additive is present in the drilling fluid in a concentration of about 0.1% to about 10% w/v of the drilling fluid.

8. The method of claim 1, wherein the cloud point glycol comprises ethoxylated butanol, C3-C10 alcohol ethoxylates, C3-C10 alcohol propoxylates, and C3-C10 alcohol alkoxylates, or a combination thereof.

9. The method of claim 1, wherein the drilling fluid has a density of about 9 lb/gal to about 20 lb/gal.

10. The method of claim 1, wherein the drilling fluid further comprises an additional fluid loss control additive.

11. The method of claim 10, wherein the additional fluid loss control additive comprises a cross-linked copolymer comprising a first comonomer of 2-acrylamido-2-methylpropanesulfonic acid in a first comonomer concentration of at least 50 mol % of the copolymer; wherein the additional fluid loss control additive additionally comprises a second comonomer comprising an N-vinyl amide-containing monomer, a terminal double bound-containing monomer, or a combination of an N-vinyl amide-containing monomer and a terminal double bound-containing monomer; wherein the second comonomer is present in a total second comonomer concentration of 50 mol % or less of the copolymer.

12. The method of claim 11, wherein the second comonomer of the additional fluid loss control additive is a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination thereof.

13. The method of claim 11, wherein the additional fluid loss control additive comprises a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof.

14. The method of claim 1, wherein the drilling fluid comprises no other fluid loss additives.

15. A system for drilling a wellbore, the system comprising:
   mixing equipment configured to mix a drilling fluid comprising:
      an aqueous base fluid;
      a first fluid loss control additive that comprises a cross-linked polymer comprising N-vinylpyrrolidone as a monomer; and
      a second fluid loss control additive that comprises a cloud point glycol; and
   pumping equipment configured to pump the drilling fluid in the wellbore,
   whereby a filter cake is formed, and subsequently introduce a brine into the wellbore,
   wherein the brine comprises zinc,
      wherein the drilling fluid comprises the second fluid loss control additive in a concentration of about 0.1% to about 10% w/v of the drilling fluid, such that the filter cake formed during the drilling exhibits enhanced filtration control capability in the presence of the subsequently introduced zinc-containing brine than a filter cake produced during drilling with an otherwise identical drilling fluid absent the second fluid loss control additive.

16. The system of claim 15, further comprising a drill string and a drill bit disposed within the wellbore; wherein the drilling fluid is pumped through the drill string and the drill bit.

17. The system of claim 15, wherein the first fluid loss control additive is a homopolymer of cross-linked polyvinylpyrrolidone, and/or wherein the second fluid loss control additive comprises ethoxylated butanol, C3-C10 alcohol ethoxylates, C3-C10 alcohol propoxylates, and C3-C10 alcohol alkoxylates, or a combination thereof.

18. The system of claim 15, wherein the first fluid loss control additive is present in the drilling fluid in a concentration of about 0.1% to about 10% w/v of the drilling fluid, and wherein the drilling fluid has a density of about 9 lb/gal to about 20 lb/gal.

19. The system of claim 15, wherein the drilling fluid comprises no other fluid loss additives.

20. The system of claim 15, wherein the zinc-containing brine has a density of about 14 lb/gal to about 20 lb/gal.

* * * * *